(12) United States Patent
Kastell et al.

(10) Patent No.: US 8,721,406 B2
(45) Date of Patent: May 13, 2014

(54) AIR DUCT FOR SUPPLYING AMBIENT AIR IN AN AIRCRAFT

(75) Inventors: Dirk Kastell, Hamburg (DE); Sebastian Roering, Hamburg (DE); Wilson Willy Casas Noriega, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 298 days.

(21) Appl. No.: 13/001,353

(22) PCT Filed: Jun. 23, 2009

(86) PCT No.: PCT/EP2009/004513
§ 371 (c)(1),
(2), (4) Date: Mar. 2, 2011

(87) PCT Pub. No.: WO2009/156120
PCT Pub. Date: Dec. 30, 2009

(65) Prior Publication Data
US 2011/0151764 A1    Jun. 23, 2011

Related U.S. Application Data

(60) Provisional application No. 61/075,814, filed on Jun. 26, 2008.

(30) Foreign Application Priority Data

Jun. 26, 2008    (DE) .......................... 10 2008 030 399

(51) Int. Cl.
*B64D 13/00*    (2006.01)

(52) U.S. Cl.
USPC .......................................... 454/76; 244/53 B (58) Field of Classification Search
USPC .......................................... 454/76; 244/53 B
See application file for complete search history.

(56) References Cited

U.S. PATENT DOCUMENTS 4,174,083 A * 11/1979 Mohn .......................... 244/53 B
4,203,566 A *  5/1980 Lord .............................. 244/57
(Continued)

FOREIGN PATENT DOCUMENTS

WO    2005016748 A    2/2005
WO    2005063569 A    7/2005
WO    2005063579 A    7/2005

OTHER PUBLICATIONS

European Patent Office, International Search Report and Opinion PCT/EP2009/004513, PCT/ISA/210 (pp. 1-4), and PCT/ISA/220 (pp. 5-11).

*Primary Examiner* — Steven B McAllister
*Assistant Examiner* — Jonathan Cotov
(74) *Attorney, Agent, or Firm* — Wood, Herron & Evans, LLP (57) ABSTRACT

An air duct for supplying ambient air in an aircraft includes an air inlet, a flow duct portion and a feed device that is devised to feed ambient air through the air inlet and the flow duct portion. A flow control flap closes the air inlet in a first position, releases a first flow cross-section of the air inlet in a second position and releases a larger second flow cross-section of the air inlet in a third position. The flow control flap is designed to not increase drag significantly in the second position while still enabling flow through the flow duct portion, while increasing drag to increase air fow through the flow duct portion in the third position.

19 Claims, 5 Drawing Sheets

(56) References Cited

U.S. PATENT DOCUMENTS

| | | | | |
|---|---|---|---|---|
| 4,307,743 A | * | 12/1981 | Dunn | 137/15.1 |
| 4,628,954 A | * | 12/1986 | Dayus | 137/75 |
| 4,641,678 A | * | 2/1987 | Haas et al. | 137/15.1 |
| 4,667,900 A | * | 5/1987 | Kim | 244/53 B |
| 4,699,322 A | * | 10/1987 | Jobst | 239/503 |
| 5,088,660 A | * | 2/1992 | Karanian | 244/53 B |
| 5,277,658 A | * | 1/1994 | Goettl | 454/259 |
| 5,603,371 A | * | 2/1997 | Gregg | 160/176.1 P |
| 5,865,398 A | * | 2/1999 | Pashea et al. | 244/53 B |
| 6,050,527 A | * | 4/2000 | Hebert et al. | 244/210 |
| 6,082,669 A | * | 7/2000 | Bardagi et al. | 244/53 B |
| 6,293,494 B1 | * | 9/2001 | Scherer et al. | 244/53 B |
| 6,349,899 B1 | * | 2/2002 | Ralston | 244/53 B |
| 6,634,597 B2 | * | 10/2003 | Johnson et al. | 244/118.5 |
| 6,729,156 B2 | * | 5/2004 | Sauterleute et al. | 62/401 |
| 7,014,144 B2 | * | 3/2006 | Hein et al. | 244/53 B |
| 7,198,062 B2 | * | 4/2007 | Hoffman et al. | 137/601.09 |
| 7,210,652 B2 | * | 5/2007 | Hein et al | 244/53 B |
| 7,461,814 B2 | * | 12/2008 | Hein et al. | 244/53 B |
| 7,469,545 B2 | * | 12/2008 | Riley | 60/794 |
| 7,540,142 B2 | * | 6/2009 | Sheoran et al. | 60/39.83 |
| 7,600,714 B2 | * | 10/2009 | Sheoran et al. | 244/53 B |
| 7,624,944 B2 | * | 12/2009 | Parikh et al. | 244/53 B |
| 7,665,694 B2 | * | 2/2010 | Hein et al. | 244/129.5 |
| 7,832,684 B2 | * | 11/2010 | Scherer et al. | 244/53 B |
| 8,141,816 B2 | * | 3/2012 | Robbins et al. | 244/53 B |
| 8,245,976 B2 | * | 8/2012 | Sakurai et al. | 244/129.5 |
| 8,322,981 B2 | * | 12/2012 | Light et al. | 415/183 |
| 2002/0152765 A1 | * | 10/2002 | Sauterleute et al. | 62/401 |
| 2002/0166923 A1 | * | 11/2002 | Munoz et al. | 244/118.5 |
| 2003/0177780 A1 | * | 9/2003 | Brutscher et al. | 62/401 |
| 2003/0223867 A1 | * | 12/2003 | Zweighaft et al. | 416/1 |
| 2006/0021424 A1 | * | 2/2006 | Ishikawa et al. | 73/118.2 |
| 2006/0196993 A1 | * | 9/2006 | Hein et al. | 244/53 B |
| 2007/0117501 A1 | * | 5/2007 | Solntsev et al. | 454/76 |
| 2007/0125906 A1 | * | 6/2007 | Scherer et al. | 244/53 B |
| 2008/0099630 A1 | * | 5/2008 | Parikh et al. | 244/53 B |
| 2008/0135689 A1 | * | 6/2008 | Parikh et al. | 244/53 B |
| 2010/0096118 A1 | * | 4/2010 | Scherer et al. | 165/253 |
| 2011/0151763 A1 | * | 6/2011 | Selchert et al. | 454/76 |
| 2011/0151764 A1 | * | 6/2011 | Kastell et al. | 454/76 |

* cited by examiner

AIR DUCT FOR SUPPLYING AMBIENT AIR IN AN AIRCRAFT

This application claims priority to PCT Application No. PCT/EP2009/004513, filed on Jun. 23, 2009 under Section 371 and/or as a continuation under Section 120, which claims priority to German Application No. 10 2008 030 399.2 and U.S. Provisional Application No. 61/075,814 both filed on Jun. 28, 2008.

TECHNICAL FIELD

The invention relates to an air duct for supplying ambient air in an aircraft.

BACKGROUND

Air ducts used in modern aircraft to supply ambient air to various systems situated on board the aircraft are conventionally configured as ram-air ducts having an air inlet and a diffuser. During cruising of the aircraft ambient air flows through the air inlet into the ram-air duct. In the diffuser, because of the slowing-down of the air flow, some of the dynamic pressure of the ambient air flow is converted to static pressure. As a result there arises in the ram-air duct a static pressure that is higher than the ambient pressure, the so-called ram pressure that ensures that the air flowing through the ram-air duct is supplied to an aircraft device that is to be supplied with ambient air, such as for example to a heat exchanger that is disposed in the ram-air duct. During ground operation of the aircraft, on the other hand, a mechanical feed device, such as for example a blower, ensures the desired ambient air supply through the ram-air duct to the aircraft device to be supplied with ambient air.

The air inlet of a ram-air duct may be configured in the form of a ram-air scoop or be integrated into the aircraft structure, around which flow occurs. An air inlet integrated into the aircraft structure, around which flow occurs, makes it possible to reduce the drag caused by the air inlet during cruising of the aircraft. An optimized air supply into the ram-air duct simultaneously combined with low drag may be realized for example with the aid of an NACA (National Advisory Committee for Aeronautics) inlet integrated into the aircraft surface, around which flow occurs.

With some aircraft systems that are to be supplied with ambient air there is the problem that these systems require a greater air-mass flow during ground operation of the aircraft than during cruising of the aircraft. A ram-air duct inlet that is optimized for the air-mass flow requirement of such aircraft systems during cruising would therefore have to have a relatively small cross section in order to minimize the drag caused by the air inlet during cruising of the aircraft. In contrast thereto, during ground operation of the aircraft a ram-air duct inlet cross section that is as large as possible would be advantageous to allow a blower, which during ground operation of the aircraft feeds ambient air through the ram-air duct to the aircraft system to be supplied with ambient air, to be operated at a feed pressure that is as low as possible. A blower fitted in a ram-air duct with a small ram-air duct inlet cross section that is optimized for cruising, on the other hand, has to be overdimensioned to provide the required high feed pressure, the disadvantageous result of this being that this blower has a large volume, a high weight and a high energy consumption and during operation causes a relatively large amount of noise.

The underlying object of the invention is to provide an air duct for supplying ambient air in an aircraft that enables an aircraft system, which requires a greater air-mass flow during ground operation of the aircraft than during cruising of the aircraft, to be supplied with ambient air in an energy-efficient manner and without the use of an overdimensioned feed device.

SUMMARY OF THE INVENTION

To achieve this object, an air duct according to the invention for supplying ambient air in an aircraft comprises an air inlet, which may be configured for example in the form of an aperture provided in an aircraft outer skin. Extending downstream of the air inlet is a flow duct portion, through which ambient air flows during operation of the air duct. In the flow duct portion an aircraft device to be supplied with ambient air, for example a heat exchanger, may be disposed. During cruising of an aircraft equipped with the air duct according to the invention, the air flowing around the aircraft outer skin flows through the air inlet into the flow duct portion of the air duct without an additional feed device being required for this purpose. However, in order also during ground operation of the aircraft equipped with the air duct according to the invention to guarantee a proper supply of ambient air to the aircraft device to be supplied with ambient air, the air duct according to the invention further comprises a feed device. The feed device, which may be configured for example in the form of a blower or an air injection system, is used during ground operation of the aircraft equipped with the air duct according to the invention to feed ambient air through the air inlet and the flow duct portion to the aircraft device that is to be supplied with ambient air.

The air duct according to the invention finally comprises a flow control flap, which is devised in a first position to close the air inlet completely and hence prevent ambient air from entering the air inlet and the flow duct portion of the air duct. Preferably the flow control flap is situated in its first position when the aircraft device to be supplied with ambient air is not in operation or is in an operating state, in which it does not require ambient air. The flow control flap of the air duct according to the invention is further devised in a second position to release a first flow cross section of the air inlet and in a third position to release a second flow cross section of the air inlet that is larger than the first flow cross section. Preferably the flow control flap of the air duct according to the invention is situated in its second position when the aircraft device to be supplied with ambient air has a relatively low ambient air requirement. In its third position, on the other hand, the flow control flap enables the supply of a large air-mass flow to the aircraft device that is to be supplied with ambient air.

The flow control flap of the air duct according to the invention is so designed and disposed that a first surface portion of the flow control flap in the second position of the flow control flap is aligned in the region of the air inlet substantially parallel to the aircraft outer skin portion surrounding the air inlet. In other words, the flow control flap has a shape and is fastened in such a way that the first surface portion extends over a sub-region of the air inlet substantially parallel to the aircraft outer skin surrounding the air inlet. Preferably the first surface portion of the flow control flap in the second position of the flow control flap is disposed substantially flush with the aircraft outer skin portion surrounding the air inlet. When the flow control flap is situated in its second position, it generates particularly low drag. During cruising of an aircraft equipped with the air duct according to the invention, the flow control flap is therefore situated preferably in its second position.

In the third position of the flow control flap, on the other hand, the first surface portion of the flow control flap is aligned at an angle to the aircraft outer skin portion surrounding the air inlet. In its third position the flow control flap therefore generates a greater drag whilst, as already mentioned, releasing a larger flow cross section of the air inlet than in its second position. Consequently the flow control flap of the air duct according to the invention is moved into its third position preferably when the aircraft device to be supplied with ambient air has a high ambient air requirement. This may be the case both during cruising and during ground operation of an aircraft equipped with the air duct according to the invention.

Although the flow control flap of the air duct according to the invention may be moved into its third position also during cruising, for example during climbing of an aircraft equipped with the air duct according to the invention, the air duct according to the invention is usable in a particularly advantageous manner to supply ambient air to an aircraft device that has a higher ambient air requirement during ground operation of the aircraft than during cruising of the aircraft. During cruising of the aircraft the flow control flap may then namely be situated predominantly in its second position, in which by reducing the flow cross section of the air inlet it ensures that the drag caused by the air inlet remains relatively low. This has an advantageous effect on the fuel consumption of the aircraft. During ground operation of the aircraft, on the other hand, the flow control flap may be situated in its third position, in which it releases a large cross section of the air inlet. The feed device, which during ground operation of the aircraft feeds ambient air through the air inlet and the flow duct portion of the air duct, may therefore be of a markedly smaller design than would be possible if the size of the air inlet were optimized for cruising of the aircraft.

A further advantage of the air duct according to the invention is that in a fault situation of a fully open flap a lower drag ensues than in the case of a conventional air duct designed for the same conditions during cruising and on the ground. In the case of a conventional air duct, therefore, in this situation the duct internal pressure resulting from the higher outside air flow is markedly higher, this entailing a corresponding design of the duct and the weight increase associated therewith.

Preferably the flow control flap of the air duct according to the invention is further so designed and disposed that a second surface portion of the flow control flap in the second position of the flow control flap is aligned at an angle to a wall portion of the flow duct portion that increases in flow direction of the ambient air flowing through the flow duct portion. In other words, the second surface portion of the flow control flap together with the wall portion of the flow duct portion forms a flow duct sub-portion having a cross section that increases in flow direction of the ambient air flowing through the flow duct portion. Consequently, in the second position of the flow control flap the second surface portion of the flow control flap and the wall portion of the flow duct portion form a diffuser that influences the flow through the flow duct portion.

In the diffuser formed by the second surface portion of the flow control flap and the wall portion of the flow duct portion, the ambient air flow supplied through the air inlet into the air duct is slowed down, so that some of the dynamic pressure of the ambient air flow is converted to static pressure. The result is consequently a static pressure that is higher than the ambient pressure, i.e. a ram pressure that ensures a proper supply of ambient air to the aircraft device that is to be supplied with ambient air, for example a heat exchanger disposed in the flow duct portion of the air duct. The flow control flap of the air duct according to the invention therefore performs the dual function of, on the one hand, adjusting a desired flow cross section of the air inlet and, on the other hand, in its second position forming together with the wall portion of the flow duct portion a diffuser.

In the third position of the flow control flap, on the other hand, the second surface portion of the flow control flap is aligned preferably substantially parallel to the wall portion of the flow duct portion. The flow through the flow duct portion of the air duct is therefore influenced only minimally by the flow control flap, thereby enabling an unimpeded feed of ambient air through the air duct by means of the feed device.

In the third position of the flow control flap the first surface portion of the flow control flap is aligned in the region of the air inlet preferably at an angle of ca. 10° to the aircraft outer skin portion surrounding the air inlet. A flow control flap that is shaped and disposed in such a way that the first surface portion in the third position of the flow control flap forms an angle of ca. 10° with the aircraft outer skin portion surrounding the air inlet, on the one hand, enables the opening of a large flow cross section of the air inlet while, on the other hand, not excessively increasing the drag caused by the air inlet.

The flow control flap of the air duct according to the invention is further preferably so designed and disposed that in the third position of the flow control flap an edge of the flow control flap, for example an edge formed by the first and the second surface portion of the flow control flap, projects into an air flow flowing around the aircraft. Air may consequently be conveyed with a higher momentum from the boundary layer into the air duct. Although this leads to increased drag, the air-mass flow control range is markedly extended.

The flow control flap of the air duct according to the invention may have a substantially triangular cross section. For example, the cross section of the flow control flap may have the shape of an isosceles triangle.

The flow control flap is preferably rotatable about an axis that is disposed in the region of the centre of gravity of the flow control flap. An axis of rotation disposed in the region of the centre of gravity of the flow control flap enables good mobility of the flow control flap with a relatively low expenditure of energy.

For example, the axis of rotation of the flow control flap may be disposed substantially in the region of a central longitudinal axis extending through the flow duct portion of the air duct according to the invention. Given such an arrangement of the axis of rotation, the first surface portion of the flow control flap in the second position of the flow control flap closes a central region of the air inlet cross section, i.e. the first surface portion of the flow control flap subdivides the cross-sectional area of the air inlet into a first portion and a second portion. In the third position of the flow control flap, when the first surface portion of the flow control flap is aligned at an angle to the aircraft outer skin portion surrounding the air inlet, the flow control flap on the other hand extends substantially along the central longitudinal axis of the flow duct portion.

The air duct according to the invention may further comprise an actuating device that is devised to move the flow control flap steplessly between its first and its third position. The actuating device may be for example a mechanical, electrical or electromechanical actuating device. A control device may further be provided, which correspondingly drives the actuating device in order to effect an adjustment of the flow control flap into a desired position.

The air duct according to the invention may further comprise a retaining device that is devised to retain the flow control flap in a desired position. The actuating device that is used to move the flow control flap between its first and its third position may simultaneously form the retaining device that retains the flow control flap in a desired position. Alternatively, however, an additional retaining device may be provided for retaining the flow control flap in a desired position.

In a method according to the invention of operating a previously described air duct, the flow control flap for supplying ambient air to an aircraft device during cruising of an aircraft equipped with the air duct is moved into its second position. During ground operation of the aircraft equipped with the air duct, on the other hand, the flow control flap for supplying ambient air to the aircraft device is moved into its third position. With the aid of the method according to the invention an aircraft device, which conventionally has a lower ambient air requirement during cruising of the aircraft than during ground operation of the aircraft, may always be supplied in an energy-efficient manner with an adequate quantity of ambient air.

In particular operating situations of the aircraft device, i.e. for example if the aircraft device during cruising of the aircraft exceptionally has a high ambient air requirement or during climbing of the aircraft, the flow control flap of the air duct may however also during cruising of the aircraft be moved into its third position in order to release an enlarged air inlet flow cross section. Equally, during ground operation of the aircraft the flow control flap may be moved into its second position if the aircraft device has a lower ambient air requirement.

BRIEF DESCRIPTION OF THE DRAWINGS

There now follows a detailed description of a preferred embodiment of the invention with reference to the accompanying diagrammatic drawings, which show.

DETAILED DESCRIPTION

An air duct 10 that is shown in FIGS. 1 to 5 comprises an air inlet 12 as well as a flow duct portion 16 that extends downstream of the air inlet 12 as far as an air outlet 14. The air inlet 12 is integrated into a skin of an aircraft equipped with the air duct 10 and is consequently surrounded by a corresponding portion 18 of the aircraft outer skin. The air duct 10 is used to supply ambient air to a heat exchanger 20 disposed in the flow duct portion 16.

During cruising of the aircraft equipped with the air duct 10, the ambient air flowing around the aircraft outer skin flows through the air inlet 12 into the flow duct portion 16 and through the heat exchanger 20. During ground operation of the aircraft, on the other hand, a blower 22 ensures that sufficient ambient air is fed through the air inlet 12 and the flow duct portion 16 to the heat exchanger 20. In the embodiment of the air duct 10 shown in FIGS. 1 to 5 the blower 22 is disposed downstream of the heat exchanger 20 in the flow duct portion 16.

Figure 1:
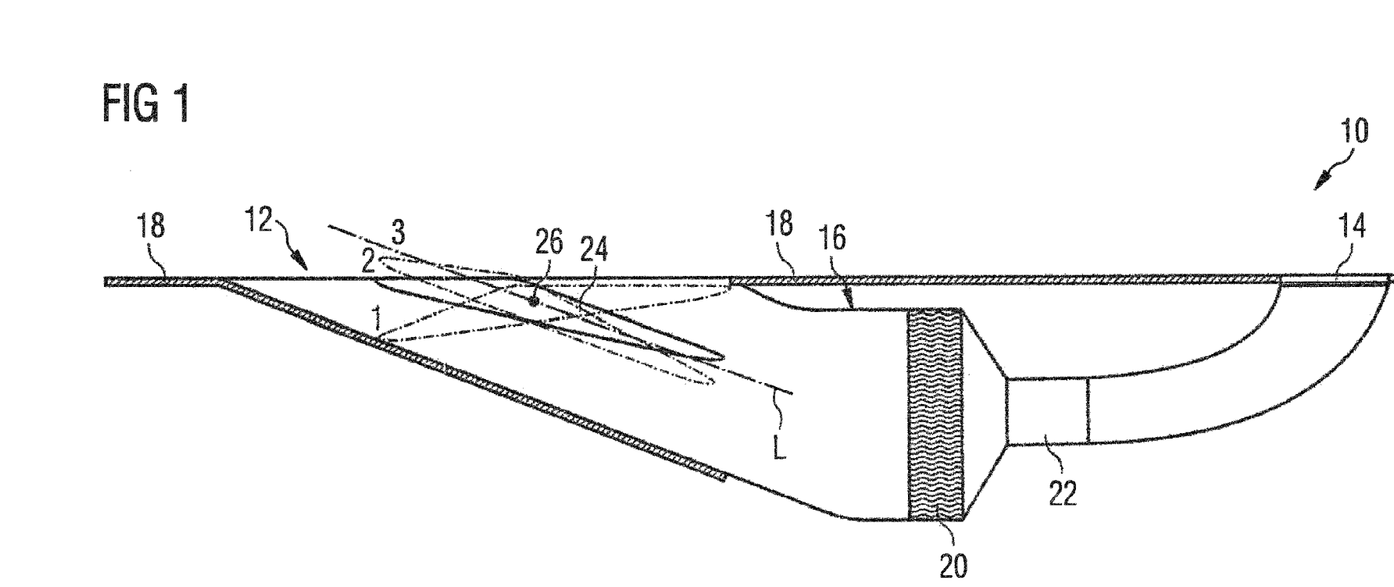
FIG. 1 a cross-sectional representation of an air duct having a flow control flap that is adjustable between a first and a third position, FIG. 2 the air duct according to FIG. 1, wherein the flow control flap is situated in its first position, FIG. 3 the air duct according to FIG. 1, wherein the flow control flap is situated in its second position, FIG. 4 the air duct according to FIG. 1, wherein the flow control flap is situated in its third position, and FIG. 5 a plan view of the air duct according to FIG. 1.

The air duct 10 further comprises a flow control flap 24, which is disposed in the region of the air inlet 12 and is adjustable steplessly between a first and a third position (see FIG. 1). The flow control flap 24 has a cross section that has substantially the shape of an isosceles triangle. In the region of a centre of gravity of the flow control flap 24 an axis of rotation 26 is provided, about which the flow control flap 24 is rotatable in order to move the flow control flap 24 between its first and its third position. The axis of rotation 26 is disposed in the region of a central longitudinal axis L extending through the flow duct portion 16 of the air duct 10.

An electromechanical actuator, which is not shown in FIGS. 1 to 5, is used to move the flow control flap 14 between its first and its third position. The electromechanical actuator is controlled with the aid of an electronic control unit. The electromechanical actuator is moreover suitable for retaining the flow control flap 24 in a desired position.

Figure 2:
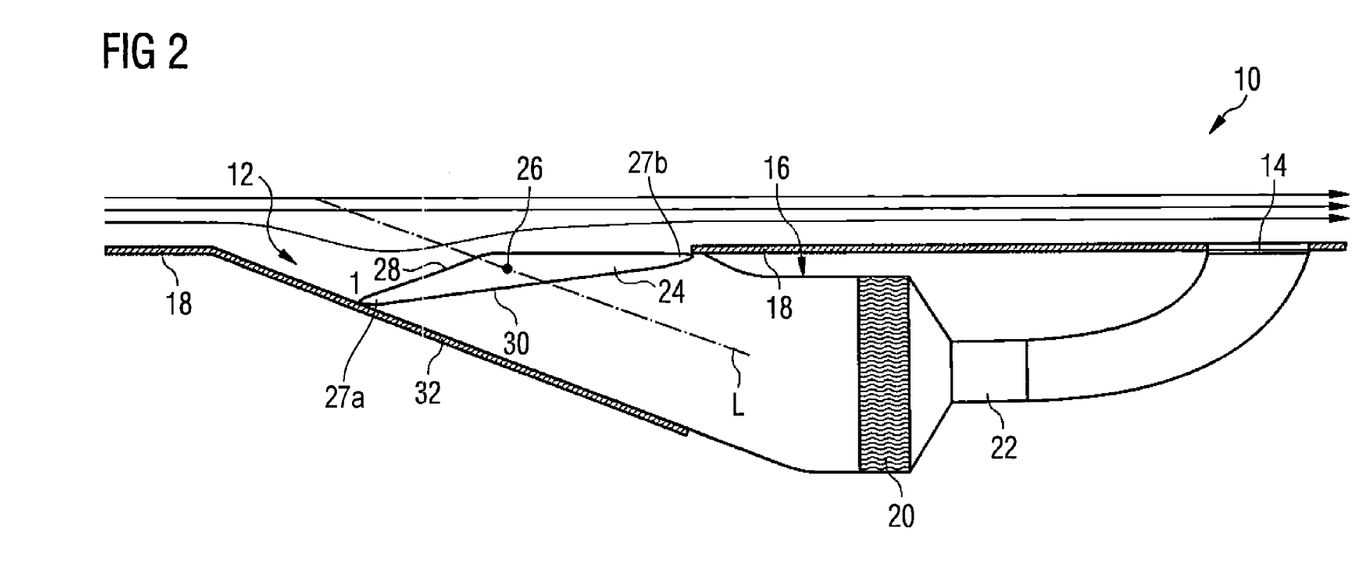

As is evident in particular from FIG. 2, the flow control flap 14 in its first position completely closes the air inlet 12, thereby preventing ambient air from being supplied through the air inlet 12 into the flow duct portion 16 of the air duct 10. In this regard, the flow control flap 14 includes an upstream end 27a and a downstream end 27b, the upstream/downstream direction being defined in a direction of air flow along the flow control flap 14, as shown clearly in FIGS. 2 through 4. The electromechanical actuator moves the flow control flap 24 into the first position shown in FIG. 2 when the heat exchanger 20 does not have to be supplied with ambient air.

Figure 3:
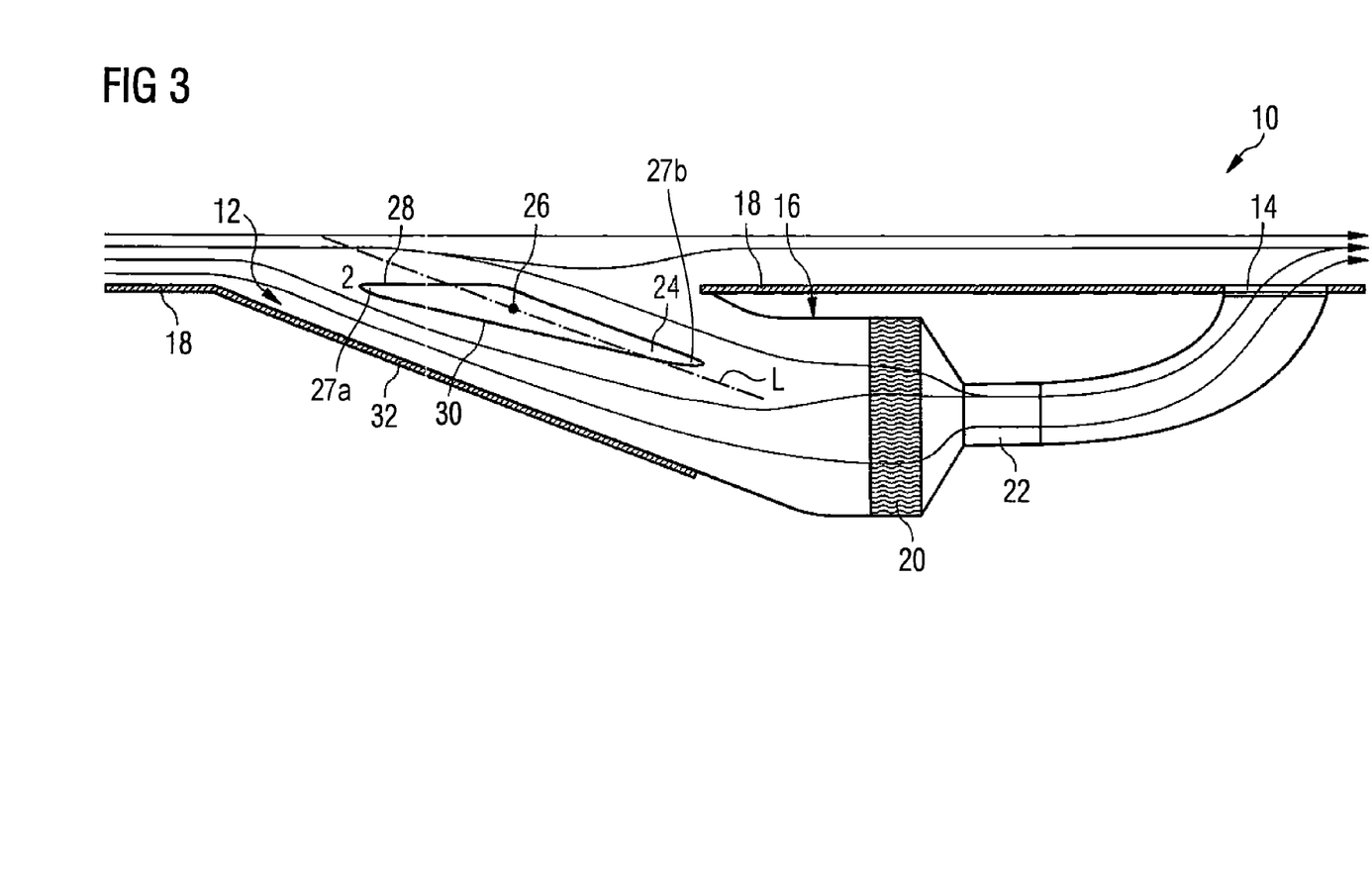

In its second position shown in FIG. 3, on the other hand, the flow control flap 24 releases a first flow cross section of the air inlet 12. A first surface portion 28 of the flow control flap 24 in this case extends substantially parallel to, and flush with, the aircraft outer skin portion 18 surrounding the air inlet 12. To this end, as shown in FIG. 3, the first surface portion 28 extends from the upstream end 27a such that the upstream end 27a is aligned with the outer skin portion 18 in this second position. Because of the arrangement of the axis of rotation 26 of the flow control flap 24 in the region of the central longitudinal axis L of the flow duct portion 16, the first surface portion 28 of the flow control flap 24 extends in a central region of the air inlet cross section. Thus, in the second position of the flow control flap 24 a central region of the flow cross section of the air inlet 12 is closed, while outer regions of the flow cross section of the air inlet 12 are released to allow ambient air to flow through.

As the first surface portion 28 of the flow control flap 24 in the second position of the flow control flap 24 is aligned substantially parallel to the aircraft outer skin portion 18 surrounding the air inlet 12, the additional drag of the aircraft caused by the air inlet 12 may be advantageously minimized. The size of the flow cross section of the air inlet 12 that is released in the second position of the flow control flap 24 is so dimensioned that during cruising of the aircraft an adequate supply of ambient air to the heat exchanger 20 is guaranteed.

Figure 4:
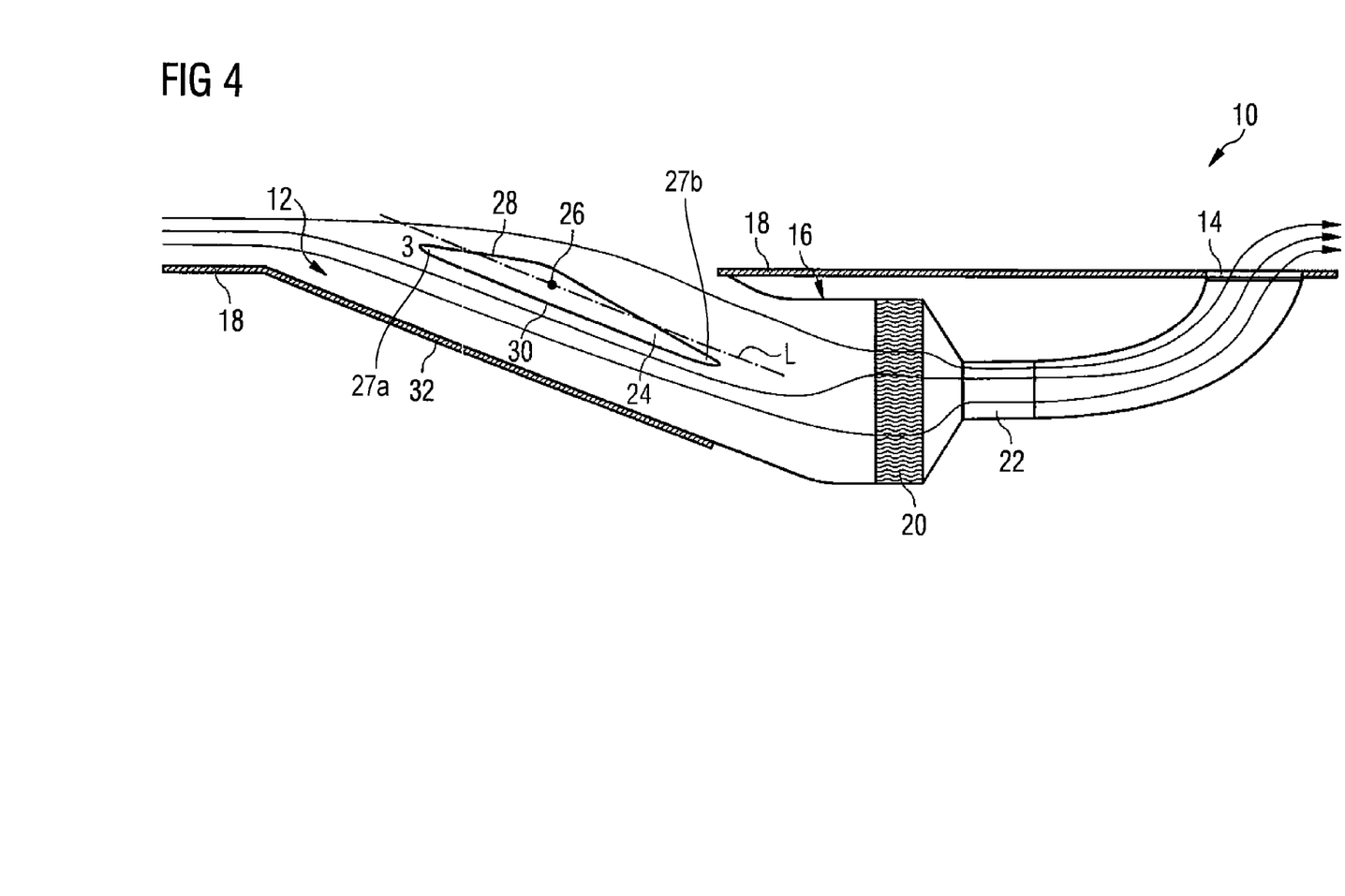
Figure 5:
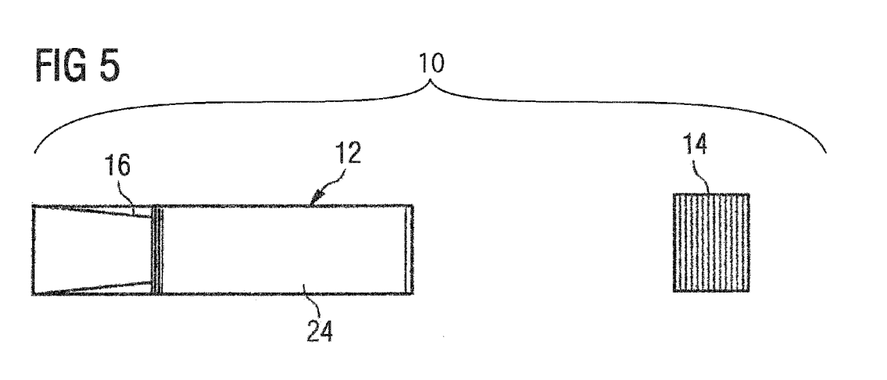

In the third position of the flow control flap 24 that is shown in FIG. 4, on the other hand, the flow control flap 24 releases a second flow cross section of the air inlet 12 that is greater than the first flow cross section of the air inlet 12 that is released in the second position of the flow control flap 24. The first surface portion 28 of the flow control flap 24 in the third position of the flow control flap 24 is disposed at an angle of ca. 10° to the aircraft outer skin portion 18 surrounding the air inlet 12. When the flow control flap 24 is situated in its third position, the flow cross section of the air inlet 12 is open to the maximum extent, thereby allowing an unimpeded flow of ambient air through the air inlet 12 and the flow duct portion 16. However, the air inlet 12 with a flow control flap 24 situated in its third position causes increased drag. To this end, as shown in FIG. 4, the upstream end 27a projects outwardly from the outer skin portion 18 into ambient air flow in this third position.

The flow control flap 24 is further so designed and disposed that in the second position of the flow control flap 24 shown in FIG. 3 a second surface portion 30 of the flow control flap 24 is aligned at an angle to a wall portion 32 of the flow duct portion 16 that increases in flow direction of the ambient air flowing through the flow duct portion 16. Thus, in the second position of the flow control flap 24 the second surface portion 30 of the flow control flap 24 together with the wall portion 32 of the flow duct portion 16 forms a diffuser that effects a slowing-down of the air flow through the flow duct portion 16. Consequently, some of the dynamic pressure of the ambient air flow is converted to static pressure, so that in the flow duct portion 16 a ram pressure that is higher than the ambient pressure arises. This ram pressure ensures that sufficient ambient air is conveyed through the heat exchanger 20 positioned in the flow duct portion 16

On the other hand, when the flow control flap 24 is situated in its third position, as shown in FIG. 4, the second surface portion of the flow control flap 24 is aligned substantially parallel to the wall portion 32 of the flow duct portion 16. In its third position the flow control flap 24 therefore only minimally influences the air flow through the flow duct portion 16. As shown clearly in FIG. 2, it will be understood that the flow control flap 14 in the first position is located such that the upstream end 27a contacts the wall portion 32 of the flow duct portion 16 inboard or spaced from the outer skin portion 18 to close flow, while the downstream end 27b contacts the outer skin portion 18 to close flow.

The heat exchanger 20 disposed in the flow duct portion 16 has a higher ambient air requirement during ground operation of the aircraft than during cruising of the aircraft. During cruising of the aircraft the flow control flap 24 is therefore situated in its second position shown in FIG. 3, in which it enables a minimizing of the additional drag caused by the air inlet 12. During ground operation of the aircraft, on the other hand, the flow control flap 24 is situated in its third position, in which it opens the flow cross section of the air inlet 12 to the maximum extent. Thus, even a blower 22 of smaller dimensions is able to feed enough ambient air through the air inlet 12 into the flow duct portion 16 to guarantee an adequate supply of ambient air to the heat exchanger 20.

The invention is:

1. An air duct for supplying ambient air in an aircraft, comprising:
an air inlet,
a flow duct portion extending downstream of the air inlet,
a feed device that is devised to feed ambient air through the air inlet and the flow duct portion, and
a flow control flap comprising a first surface portion extending from a first terminal end to a junction point and a second surface portion extending from a second terminal end to the junction point, the flow control flap movable to at least first, second, and third positions via rotation about a pivot axis, with the pivot axis located between the first and second surface portions such that the pivot axis is positioned between a first plane defined through the first and second terminal ends and a second plane parallel to the first plane and defined through the junction point,
wherein in the first position, the flow control flap closes the air inlet; in the second position, the flow control flap releases a first flow cross section of the air inlets; and in the third position, the flow control flap releases a second flow cross section that is larger than the first flow cross section,
wherein the flow control flap is so designed and disposed that
in the second position, the first surface portion is aligned in the region of the air inlet substantially parallel to and substantially flush with an aircraft outer skin portion surrounding the air inlet, and
in the third position, the first surface portion is aligned in the region of the air inlet at an angle to the aircraft outer skin portion surrounding the air inlet.

2. The air duct according to claim 1, wherein the flow control flap is so designed and disposed that a third surface portion of the flow control flap in the second position of the flow control flap is aligned at an angle to a wall portion of the flow duct portion such that the flow cross section of the flow duct portion increases in a flow direction of the ambient air flowing through the flow duct portion.

3. The air duct according to claim 2, wherein the flow control flap is so designed and disposed that the third surface portion of the flow control flap in the third position of the flow control flap is aligned substantially parallel to the wall portion of the flow duct portion.

4. The air duct according to claim 1, wherein the flow control flap is so designed and disposed that in the third position of the flow control flap, one of the first and second terminal ends projects into an air flow flowing around the aircraft.

5. The air duct according to claim 1, wherein the flow control flap has a substantially triangular cross section.

6. The air duct according to claim 1, wherein the pivot axis is disposed in the region of the center of gravity of the flow control flap.

7. The air duct according to claim 6, wherein the pivot axis is disposed substantially in the region of a central longitudinal axis extending through the flow duct portion.

8. The air duct according to claim 1, further comprising:
an actuating device that is devised to move the flow control flap steplessly between the first and third positions.

9. The air duct according to claim 1, further comprising:
a retaining device that is devised to retain the flow control flap in a desired position.

10. The air duct of claim 1, wherein the flow control flap for supplying ambient air to an aircraft device during cruising of an aircraft equipped with the air duct is configured to be moved into its second position and wherein the flow control flap for supplying ambient air to the aircraft device during ground operation of the aircraft equipped with the air duct is configured to be moved into its third position.

11. The air duct according to claim 1, wherein the flow duct portion includes a wall portion extending inwardly from the aircraft outer skin portion, and the flow control flap in the first position is located such that the first terminal end engages with the wall portion of the flow duct portion to block air flow through the flow duct portion and such that the second terminal end engages with the aircraft outer skin portion to block air flow through the flow duct portion.

12. An air duct for supplying ambient air in an aircraft comprising:
an air inlet surrounded by an aircraft outer skin portion;
a flow duct portion extending downstream of the air inlet,
a feed device operable to feed ambient air through the air inlet and the flow duct portion, and
a flow control flap located at least in part in the flow duct portion and comprising a first surface portion extending from a first terminal end to a junction point and a second surface portion extending from a second terminal end to the junction point, the flow control flap movable to at least a first position, a second position, and a third position via rotation about a pivot axis, with the pivot axis located between the first and second surface portions such that the pivot axis is positioned between a first plane defined through the first and second terminal ends and a second plane parallel to the first plane and defined through the junction point wherein:

in the first position, the flow control flap closes the air inlet, with one of the first and second terminal ends closing the air inlet at the aircraft outer skin portion and the other of the first and second terminal ends closing the air inlet at a wall portion of the flow duct portion that is located inboard of the aircraft outer skin portion, in the second position, the flow control flap releases a first flow cross section of the air inlet, and the first surface portion is aligned substantially parallel to and substantially flush with the aircraft outer skin portion which surrounds the air inlet, and neither of the first and second terminal ends of the flow control flap closes off the air inlet; and in the third position, the flow control flap releases a second flow cross section that is larger than the first flow cross section, and the first surface portion is aligned at an angle to the aircraft outer skin portion which surrounds the air inlet.

13. The air duct of claim 12 wherein when the flow control flap is in the second position and the third position, ambient air is capable of flowing along the flow duct portion both fore and aft of the pivot axis.

14. The air duct of claim 12, wherein the flow control flap also includes a third surface portion extending from the first terminal end and facing towards the wall portion of the flow duct portion, wherein:

in the second position, the third surface portion is angled from the wall portion of the flow duct portion such that the flow cross section of the flow duct portion increases in a flow direction of air flow through the flow duct portion; and in the third position, the third surface portion is parallel to the wall portion of the flow duct portion.

15. The air duct according to claim 12, wherein the flow control flap is so designed and disposed that in the third position of the flow control flap, one of the first and second terminal ends projects into an air flow flowing around the aircraft.

16. The air duct according to claim 15, wherein the flow control flap is so designed and disposed that in the third position, the flow control flap releases a maximum flow cross section of the air inlet larger than all other flow cross sections releasable by the flow control flap.

17. The air duct according to claim 16, wherein the flow control flap is blocked from rotating beyond the first position in one rotational direction about the pivot axis and is blocked from rotating beyond the third position in another rotational direction about the pivot axis.

18. The air duct according to claim 4, wherein the flow control flap is so designed and disposed that in the third position, the flow control flap releases a maximum flow cross section of the air inlet larger than all other flow cross sections releasable by the flow control flap.

19. The air duct according to claim 18, wherein the flow control flap is blocked from rotating beyond the first position in one rotational direction about the pivot axis and is blocked from rotating beyond the third position in another rotational direction about the pivot axis.

* * * * *